United States Patent [19]

Erä et al.

[11] 4,239,667
[45] Dec. 16, 1980

[54] METHOD FOR PREPARING POLYURETHANE COATINGS FROM A NEUTRAL SUBSTANCE OF MIXED SOAP

[75] Inventors: Väinö Erä,

[73] Assignee: Oy Kaukas AB, Lappeenranta, Finland

[21] Appl. No.: 6,309

[22] Filed: Jan. 24, 1979

Related U.S. Application Data

[63] Continuation of Ser. No. 870,300, Jan. 18, 1978, abandoned.

[30] Foreign Application Priority Data

Feb. 16, 1977 [FI] Finland ................................ 770496

[51] Int. Cl.³ ............................................ C08G 18/30
[52] U.S. Cl. ................................ 260/18 TN; 528/75; 528/85
[58] Field of Search ............... 260/18 TN; 528/75, 85

[56] References Cited

U.S. PATENT DOCUMENTS

| | | | |
|---|---|---|---|
| 2,812,337 | 11/1957 | Culemeyer | 260/18 TN |
| 3,183,109 | 5/1965 | Neumann et al. | 260/18 TN |
| 3,211,674 | 10/1965 | Sandridge | 260/18 TN |
| 3,637,539 | 1/1972 | Wolff et al. | 260/18 TN |
| 3,708,448 | 1/1973 | Ippolito et al. | 260/18 TN |
| 3,965,085 | 6/1976 | Holmbom et al. | 260/97.6 |
| 4,044,031 | 8/1977 | Johansson et al. | 260/397.25 |

FOREIGN PATENT DOCUMENTS

1405434 9/1975 United Kingdom ............... 260/18 TN

OTHER PUBLICATIONS

Turner (ed) *The Condensed Chemical Dictionary*, Reinhold, NY, pp. 577–578, 1942.

*Primary Examiner*—Maurice J. Welsh
*Attorney, Agent, or Firm*—Ladas & Parry

[57] ABSTRACT

A method for preparing polyurethane coatings from a component substituting polyols, a triisocyanate and a catalyst by applying a mixture of said components and by polymerizing at a raised temperature, wherein the component substituting polyols is a neutral substance of mixed soap.

4 Claims, No Drawings

METHOD FOR PREPARING POLYURETHANE COATINGS FROM A NEUTRAL SUBSTANCE OF MIXED SOAP

This is a continuation of application Ser. No. 870,300 filed Jan. 18, 1978, now abandoned.

This invention relates to a method for preparing polyurethane coatings for metal sheets by applying a mixture containing a component substituting polyols, triisocyanate and a tertiary amine catalyst to a metal sheet and by polymerizing at a raised temperature, wherein the component substituting polyols is a neutral substance of mixed soap having a hydroxyl number in the range of 60 to 100 (mg KOH/g) and purified by dissolving it in an inert solvent and by separating the insoluble portion through filtration.

There is a lot of literature discussing polyurethanes and their preparation. It is well-known that polyurethane products can be prepared from tall oil by reacting tall oil with diethanol amine and polyisocyanate (DOS 2,239,235). It is also known that fatty acids of tall oil can be hydroxylated and converted into polyurethane products by reacting them with polyisocyanates (U.S. Pat. No. 3,211,674). Moreover, fatty acids of tall oil can be esterified and reacted with isocyanates to obtain coatings (U.S. Pat. No. 2,812,337). A special method for preparing polyurethane coatings from a mixture of tall oil, castor oil and isocyanates is also known (U.S. Pat. No. 3,708,448).

The quality of tall oil has in recent years continuously deteriorated due to the use of birch in the production of cellulose, where birch oil causes contamination and renders the distillation process more difficult. By means of a method developed in Finland these difficulties can be overcome by extracting a neutral substance with a mixture of solvents. The production yields abt. 1000 tons per annum of a so called neutral substance, the exploitation whereof is of great economic importance.

The neutral substance of mixed soap comprises sterol type compounds as well as various fatty alcohols. As far as the method according to this invention is concerned, the most important components are the above mentioned compounds because they contain hydroxyl groups and react with isocyanates to produce polyurethanes. In the method according to this invention, said neutral substance is used as the reactive component in the preparation of polyurethane coatings. The economy of the method is supported by the fact that the neutral substance substitute the expensive polyols usually used in the coating mixtures.

The neutral substance can be characterized on the basis of the hydroxyl number, on the basis whereof the reactivity of the neutral substance is evaluated and the quantity of isocyanate to be added to the mixture is calculated.

The adhesion of the coatings prepared by the method according to the invention to metal sheets is extremely good.

The coatings prepared according to the invention are resistant to solvens, fats, oils as well as diluted acids and alkali and to temperatures of up to 270° C.

The coatings prepared by the method according to the invention are non-toxic and objects coated with them can be used, for example, in the food industry and in households.

The polyurethane coatings prepared by the method according to the invention are transparent and light, and they can be easily dyed. This is surprising because the starting material, i.e. the neutral substance, is dark in colour.

EXAMPLE 1

Preparation of the Polyurethane Coating (a) Preparation of a solution of the neutral substance 25 g of neutral substance of mixed soap having a hydroxyl number of 89 was dissolved in 50 g ethyl acetate and the substance insoluble in the solvent was separated by filtration.

(b) Preparation of a mixture of the neutral substance and isocyanate 25 g of "Desmodur N 100" compound was added to 75 g of the solution prepared according to (a) ("Desmodur N" is an aliphatic triisocyanate compound having a NCO content of 16.5%; the content of reactive component is 100%) and 0.5 g of "Desmorapid PP" catalyst ("Desmorapid PP" is a tertiary amine).

(c) Preparation of the coating.

The mixture of neutral substance and isocyanate prepared in the manner described above was applied with a spatula to a metal sheet and heat treated for 15 minutes at 150° C. The coating thus obtained was yellowish in colour and transparent. The adhesion of the coating to the metal sheet was extremely good.

EXAMPLE 2

(a) The procedure was the same as in Example (1a).

(b) The procedure was the same as in Example (1b) except that the mixture was refluxed for one hour.

(c) The procedure was the same as in Example (1c).

What we claim is:

1. A method for preparing polyurethane coatings from a polyol component, a triisocyanate, and a catalyst by forming a mixture of said components and by polymerization of same at a raised temperature, wherein the polyol component has a hydroxyl number in the range of 60 to 100 and consists essentially of fatty alcohols and sterols.

2. A method for preparing polyurethane coatings for metal sheets from a polyol component, a triisocyanate and a tertiary amine catalyst by applying a mixture of said components to a metal sheet and by polymerizing same at a raised temperature, wherein the polyol component has a hydroxyl number in the range of 60 to 100 (mg KOH/g) and consisting essentially of fatty alcohols and sterols and is purified by dissolving an inert solvent to separate the insoluble portion through filtration.

3. The method defined in claim 2 wherein the polyol component has a hydroxyl number of 85 to 95 (mg KOH/g).

4. The method defined in claim 2, wherein the polyol component is purified by dissolving it in ethyl acetate and by separating the insoluble portion through filtration.

* * * * *

UNITED STATES PATENT AND TRADEMARK OFFICE
CERTIFICATE OF CORRECTION

PATENT NO. : 4239667
DATED : December 16, 1980
INVENTOR(S) : Erä, Väinö; and Lindberg, J. Johan It is certified that error appears in the above—identified patent and that said Letters Patent is hereby corrected as shown below:

Under [75] Inventors, "Väinö Erä" should read

--Väinö Erä and J. Johan Lindberg--

Signed and Sealed this

Eleventh Day of August 1981

[SEAL]

Attest:

Attesting Officer

GERALD J. MOSSINGHOFF

Commissioner of Patents and Trademarks